US012666518B2

(12) United States Patent
Yan et al.

(10) Patent No.: US 12,666,518 B2
(45) Date of Patent: Jun. 23, 2026

(54) LIGHTING APPARATUS

(71) Applicant: LEEDARSON LIGHTING CO., LTD., Zhangzhou (CN)

(72) Inventors: Ping Yan, Zhangzhou (CN); Zhiwei Su, Zhangzhou (CN); Jinglong Chen, Zhangzhou (CN); Zhihua Wang, Zhangzhou (CN); Huitang Zhang, Zhangzhou (CN); Linhua Wang, Zhangzhou (CN); Zhenhong Zhu, Zhangzhou (CN); Huiyong Huang, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 221 days.

(21) Appl. No.: 18/612,914

(22) Filed: Mar. 21, 2024

(65) Prior Publication Data

US 2024/0431010 A1 Dec. 26, 2024

(30) Foreign Application Priority Data

Jun. 26, 2023 (CN) ......................... 202321636317.5

(51) Int. Cl.
*H05B 47/175* (2020.01)
*H05B 45/20* (2020.01)

(52) U.S. Cl.
CPC ......... *H05B 47/1985* (2024.01); *H05B 45/20* (2020.01)

(58) Field of Classification Search
CPC ...... H05B 47/199; H05B 45/18; H05B 47/11; H05B 47/115; H05B 47/19; H05B 47/198; H05B 47/1985; H05B 45/20; H05B 47/155; H05B 47/18; H05B 47/1965; H05B 1/0261; H05B 2213/05; H05B 45/00; H05B 45/14; H05B 45/24; H05B 45/37; H05B 45/46; H05B 47/183; H05B 47/196; H05B 47/20
See application file for complete search history.

(56) References Cited

U.S. PATENT DOCUMENTS

2022/0070982 A1 * 3/2022 Hussell .................. H05B 47/19

* cited by examiner

*Primary Examiner* — Monica C King
(74) *Attorney, Agent, or Firm* — LANWAY IPR SERVICES; Chun-Ming Shih

(57) ABSTRACT

A lighting apparatus includes a light source module, a driver and a processor. The light source module includes multiple light zones. Different light zones have different LED module combinations. The driver is coupled to an external power source to generating driving currents to the light source module. The processor receives a control command for adjusting colors of the multiple light zones separately by sending control signals to the driver. The control signals indicate duty ratios of the multiple LED modules of the multiple light zones to adjust the colors of the multiple light zones.

19 Claims, 14 Drawing Sheets

LIGHTING APPARATUS

FIELD

The present invention is related to a lighting apparatus, and more particularly related to a lighting apparatus with flexible control.

BACKGROUND

The advent of Light Emitting Diode (LED) technology marked a significant milestone in the evolution of lighting solutions, offering a myriad of advantages over traditional lighting sources. LEDs are semiconductor devices that convert electricity directly into light through the movement of electrons within the material. This process, known as electroluminescence, allows LEDs to emit light efficiently and with minimal heat production. The basic idea of LED technology revolves around its capacity to produce high-quality light in a range of colors and intensities, all while consuming significantly less energy compared to incandescent and fluorescent lighting systems.

LEDs have become increasingly popular in lighting applications due to their durability, longevity, and energy efficiency. Unlike conventional lighting options, LEDs are known for their extended lifespan, which can dramatically reduce maintenance and replacement costs. Furthermore, their energy-efficient nature not only leads to substantial energy savings but also contributes to a reduction in greenhouse gas emissions, aligning with global sustainability goals. The compact size of LEDs offers additional versatility, enabling the design of lighting devices that are smaller, sleeker, and capable of fitting into tight spaces where traditional bulbs cannot.

The utility of LED devices extends beyond mere illumination. They are integral to various applications ranging from residential and commercial lighting to advanced industrial and medical equipment. The inherent controllability of LEDs is one of their most attractive features, allowing for precise manipulation of light intensity, color, and distribution. This flexibility facilitates the creation of dynamic lighting environments that can adapt to specific needs or conditions, enhance aesthetic appeal, or improve functionality. For instance, in the realm of smart lighting systems, LEDs can be integrated with sensors and control systems to enable automated adjustments based on factors like time of day, occupancy, or ambient light levels.

Moreover, the ability of LED lighting to support a spectrum of colors and color temperatures has paved the way for innovative applications in mood lighting, horticulture, and therapeutic devices, where specific light qualities can induce desired effects or responses. The rapid advancement in LED technology continues to expand its application scope, making it a cornerstone of modern lighting solutions that prioritize energy efficiency, operational flexibility, and enhanced user experience. Thus, the integration of LED technology into lighting fixtures represents a forward-looking approach that not only addresses current lighting needs but also sets the stage for future innovations in lighting design and functionality.

Building on the versatile foundation of LED technology, the landscape of lighting devices has diversified to encompass a wide array of types, each tailored to specific applications and user requirements. Among these, residential lighting fixtures stand out for their focus on aesthetics and functionality, offering solutions that range from ambient and task lighting to accent and decorative lighting. These fixtures are designed to enhance the living spaces' ambiance while providing efficient and adjustable illumination that can be tailored to the occupants' activities and preferences.

In the commercial and industrial sectors, LED lighting devices take on robust forms, engineered to withstand harsh conditions while providing reliable and consistent light output. High-bay lights, street lamps, and floodlights exemplify this category, offering high-intensity illumination that is crucial for safety and operational efficiency in factories, warehouses, outdoor areas, and public spaces. These devices often incorporate features like dimming capabilities, emergency backup, and integrated control systems for energy management and operational optimization.

Specialized LED lighting solutions have also emerged to meet the unique demands of sectors like healthcare, where precision and reliability are paramount. Surgical lights, for example, are designed to provide clear, shadow-free illumination, assisting medical professionals during procedures. Similarly, in the realm of horticulture, LED grow lights have revolutionized indoor farming by delivering specific light spectra to promote plant growth, flowering, and fruiting, optimizing agricultural productivity in controlled environments.

Moreover, the advent of smart LED lighting has introduced a new dimension to lighting devices, integrating them with IoT technology to offer enhanced control, customization, and automation. Smart bulbs, panels, and strips can be controlled remotely via smartphones or voice commands, allowing users to adjust the lighting according to their preferences or even synchronize it with other smart home devices for a cohesive and automated home environment.

In the realm of architectural and landscape lighting, LEDs have enabled innovative designs that not only illuminate spaces effectively but also highlight architectural features and landscape elements. These lighting devices are designed to blend seamlessly with the environment, providing both functionality and aesthetic enhancement, and often feature weather-resistant and durable constructions to withstand outdoor elements.

Each of these lighting device types showcases the adaptability and scalability of LED technology, offering solutions that cater to a wide spectrum of lighting needs across different environments and applications. This diversity not only demonstrates the technological advancements in LED lighting but also highlights the potential for further innovation in the design and functionality of lighting devices.

Mixing light sources to achieve desired light colors presents unique challenges, particularly when considering the fundamental principles of color theory and the distinctions between LED and traditional light sources. Color theory, which is essential in understanding how different light colors combine, is rooted in the additive color model where primary colors (red, green, and blue) are mixed in various proportions to create a broad spectrum of colors. In LED technology, this model is particularly relevant as LEDs can be designed to emit light in narrow spectral bands, typically corresponding to these primary colors. When these colors are mixed, they can produce a wide range of hues, allowing for precise color control and customization.

However, the challenge arises in achieving the exact desired color, as the mixing process must account for the specific spectral characteristics of each LED. The purity and intensity of the colors emitted by LEDs can lead to vibrant and saturated colors, but mixing these colors to achieve a specific shade or white light with a desired color temperature requires careful balancing of the intensities and wavelengths of the individual LEDs.

In contrast, traditional light sources like incandescent or fluorescent lamps emit light across a broader spectrum, resulting in a more diffuse and blended light output. These sources typically produce a warm white light due to their broad spectral emission that spans across most of the visible spectrum, with a continuous distribution of wavelengths. Mixing colors with traditional sources is less precise than with LEDs because the emitted light is already a blend of all the visible colors, making it challenging to isolate and mix specific colors without the use of external filters.

Furthermore, traditional light sources often exhibit variations in color output over time and with changes in temperature or voltage, complicating the task of maintaining a consistent color mix. LEDs, while more stable in their color output, also require careful management of thermal conditions to ensure consistent color performance over time.

The difficulty in mixing light colors is also influenced by the phenomenon of color metamerism, where two different light sources can appear to be the same color under certain conditions but differ under other lighting. This effect underscores the complexity of achieving an exact color match or blend, as the perceived color can vary depending on the lighting context and the observer's perspective.

In summary, while LED light sources offer advantages in terms of energy efficiency, longevity, and color control, mixing light sources to achieve desired colors is a nuanced process that requires a deep understanding of color theory, the spectral properties of the light sources, and the interplay of light in different environments. The transition from traditional to LED lighting has facilitated greater control and customization in color mixing, but it also demands a more sophisticated approach to ensure that the desired hues and effects are accurately and consistently achieved.

SUMMARY

In some embodiments, a lighting apparatus includes a light source module, a driver and a processor.

The light source module includes multiple light zones.

Different light zones have different LED module combinations.

The driver is coupled to an external power source to generating driving currents to the light source module.

The processor receives a control command for adjusting colors of the multiple light zones separately by sending control signals to the driver.

The control signals indicate duty ratios of the multiple LED modules of the multiple light zones to adjust the colors of the multiple light zones.

In some embodiments, where the processor maintains a mapping relation between color adjustment and duty ration adjustment in a PWM control design.

In some embodiments, the control command indicates target colors of the multiple light zones.

The processor translates the control command to corresponding control signals.

In some embodiments, the processor provides a first mode that all light zones emit lights of same color.

The processor provides a second mode that different light zones emit lights of different colors.

In some embodiments, the processor provides a third mode that indicates an object type and the processor translates the object type to corresponding driving signals that generate colors to enhance camera image capturing of the object type.

In some embodiments, where the processor maintains multiple reference color coordinates and corresponding duty ratio parameters.

The processor determines a target duty ratio parameter of a target color of the light zone by reference to adjacent reference color coordinates.

In some embodiments, the processor calculates the target duty ratio parameter according to stored duty ration parameters of the reference color coordinates.

In some embodiments, the processor maintains a group range of target colors for each reference color coordinate.

The processor identifies the reference color coordinate by checking group ranges of the reference color coordinates.

In some embodiments, the control command indicates an adjustment path involves a color variation.

The processor uses a non-linear variation on duty ratio adjustment of the control signals.

In some embodiments, control of the light zones are separately added to the processor.

In some embodiments, the control command includes multiple sub-commands respectively for controlling different light zones.

In some embodiments, the processor receives the sub-commands from a remote control and generates the control signals according to received sub-commands of the remote control.

In some embodiments, the light zones are mounted on different brackets for directing lights to different directions.

In some embodiments, the light zones comprise optical components to change light directions of the light zones.

In some embodiments, filters are added to the light zones to change spectral distributions of the light zones.

In some embodiments, the processor records filter parameters of the filters to calculate the control signals.

In some embodiments, a light cover is disposed above the LED modules, and distance between two adjacent LED modules is less than ⅓ of height between the LED modules and the light cover.

In some embodiments, when the processor handles a color adjustment from a starting color to a destination color, the processor calculates two boundary colors in a color space according to a line passing the starting color and the destination color.

The processor uses duty ratio parameters of the starting color and the two boundary colors.

In some embodiments, the processor transforms the color from a first color space to a second color space to find multiple intermediate colors in the second color space during color adjustment.

In some embodiments, the first color space is CIE1931.

DETAILED DESCRIPTION

Figure 10:
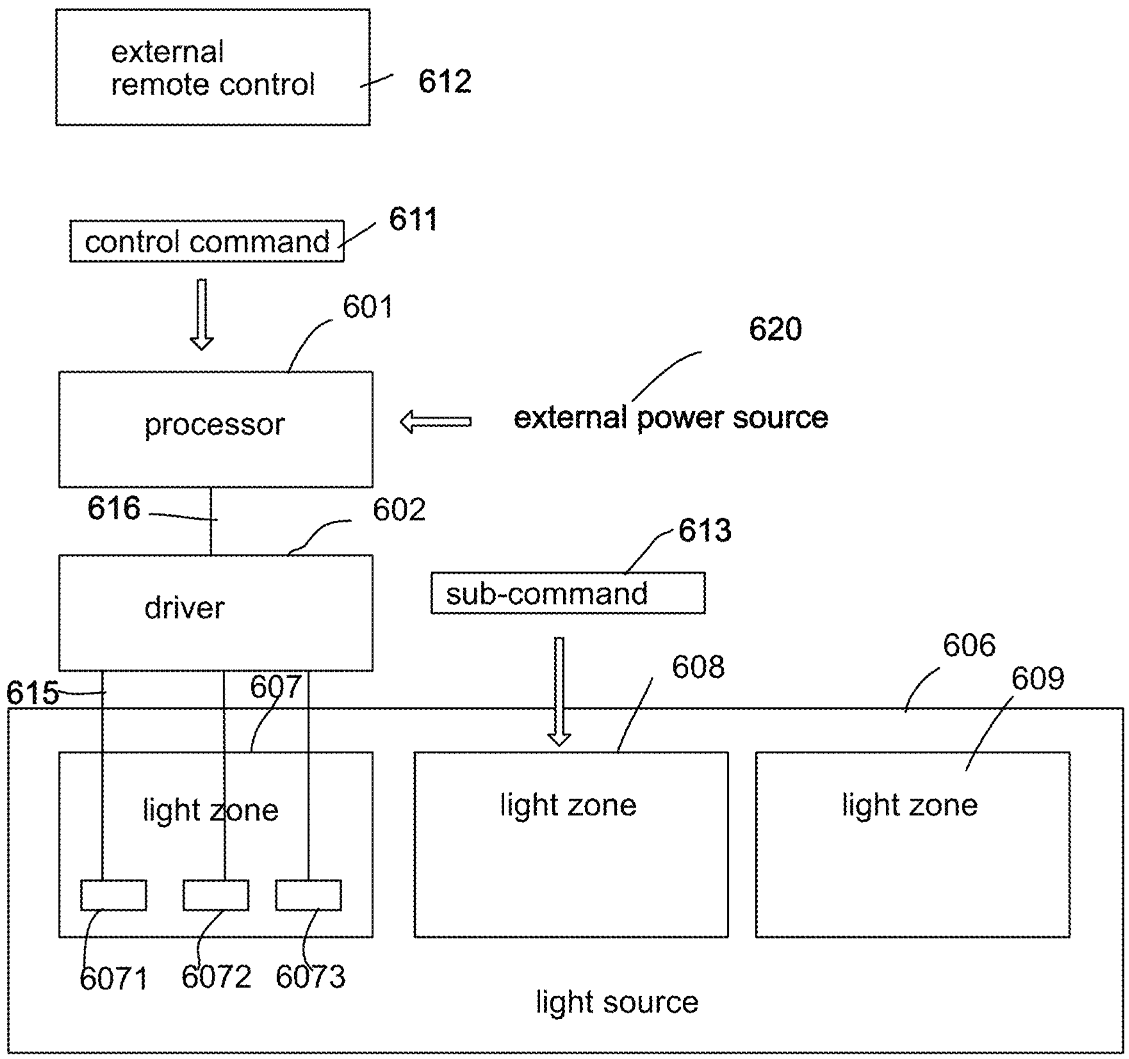
FIG. 10 illustrates a lighting apparatus embodiment.

Please refer to FIG. 10, a lighting apparatus includes a light source module 606, a driver 602 and a processor 601.

The light source module 606 includes multiple light zones 607, 608, 609.

Different light zones 607, 608, 609 have different LED module combinations. For example, the light zone 607 has three LED modules 6071, 6072, 6073 that have different color temperatures and/or colors while the other light zone 608 may have different combination of different type of LED modules. That makes different light zones with different parameters and makes overall mixture more flexible and more colorful.

The driver 602 is coupled to an external power source 620 to generating driving currents 615 to the light source modules 6071, 6072, 6073.

In the context of LED light source design, Pulse Width Modulation (PWM) control emerges as a pivotal mechanism for modulating the light output, especially when the objective is to mix lights of various colors to achieve a desired composite light color or color temperature. PWM involves the rapid switching on and off of the LED power supply at a frequency that is sufficiently high to prevent the human eye from detecting any flickering. The essence of PWM control lies in its ability to vary the perceived intensity of the LEDs by adjusting the duration for which the LEDs are turned on during each cycle of the modulation.

The duty ratio, or duty cycle, is a critical parameter in PWM control, signifying the proportion of time in each cycle that the LED is energized. Expressed as a percentage, the duty ratio determines the average power delivered to the LED over time. A higher duty ratio corresponds to a longer "on" time within each cycle, leading to increased light output from the LED, while a lower duty ratio reduces the "on" time and consequently diminishes the light output.

PWM signals are generated using electronic circuits or microcontrollers that can rapidly switch the LED power supply on and off. The precision in controlling the duty ratio allows for meticulous adjustment of the light intensity for each LED. In the context of mixing light from different LED modules, each possibly representing a distinct color or white light of a particular color temperature, the duty ratio becomes a tool for fine-tuning the color output of the combined light source.

By controlling the duty ratios among different currents supplied to various LED modules, one can effectively alter the final mixed light output. For instance, to achieve a specific shade of white light or a particular color temperature, the duty ratios for red, green, and blue LED modules are adjusted relative to one another. This adjustment modulates the intensity of each colored light in the mix, thereby influencing the overall color and temperature of the emitted light.

In the design of LED lighting systems, the ability to control the duty ratio through PWM enables the creation of a versatile lighting fixture capable of producing a wide range of colors and color temperatures. This control mechanism is essential for applications requiring dynamic lighting scenarios, where the mood, ambiance, or functional lighting needs can vary significantly.

PWM control and the management of the duty ratio in LED light source design are fundamental for achieving precise control over the light output characteristics. These include color mixing, intensity modulation, and color temperature adjustment, enabling the creation of advanced lighting systems that can be tailored to specific requirements or preferences. The technological implementation of PWM in LED lighting underscores the sophistication and adaptability of modern lighting solutions, facilitating a seamless integration of efficiency, control, and aesthetic versatility in lighting design.

The processor 601 receives a control command 601 for adjusting colors of the multiple light zones 607, 608, 609 separately by sending control signals 616 to the driver 602.

In the practical design of LED lighting systems, the processor and driver components are typically realized as distinct circuits, each engineered to meet specific operational requirements. The processor, often a microcontroller or a digital signal processor (DSP), serves as the brain of the system, executing software commands and handling the logical control aspects, such as timing, color mixing algorithms, and communication protocols. The driver circuit, on the other hand, is responsible for delivering the appropriate power to the LEDs, converting the processor's control signals into the necessary current and voltage to drive the LED array.

Although the processor and driver are fundamentally different in their functions, there can be a degree of overlap or sharing of components between them. For example, power management and signal conditioning elements might be used by both circuits, facilitating a more integrated and compact system design. In some embodiments, particularly in smaller or more cost-sensitive applications, the processor and driver circuits can be fully integrated into a single chip or module, streamlining the design and reducing the overall footprint of the lighting system.

Advancements in technology have led to processors with increasingly sophisticated capabilities, capable of executing complex software commands. This evolution allows for intricate configurations and operations to be programmed into the processor, enabling more flexible and comprehensive control over the lighting system. Modern processors can manage a wide range of functions, from simple on/off control to dynamic color mixing, intensity modulation, and even communication with other devices in a networked lighting system.

In the realm of LED lighting, the integration of advanced processors with versatile driver circuits has opened up new possibilities for smart lighting solutions. These systems can adapt to varying environmental conditions, user preferences, and operational requirements, offering unprecedented levels of customization and functionality. The processor's ability to execute complex software commands means that the lighting system can be configured to perform a variety of tasks, from basic illumination to intricate visual displays and energy management strategies.

In conclusion, the distinction between processor and driver circuits in LED lighting design underscores the multifaceted nature of modern lighting systems, where dedicated components are optimized for specific tasks yet are capable of integration and cooperation. The continuous advancement in processor technology further enhances the system's capabilities, allowing for more sophisticated control mechanisms and enabling lighting systems to meet the diverse and evolving needs of today's applications.

The control signals indicate duty ratios of the multiple LED modules of the multiple light zones to adjust the colors of the multiple light zones.

In some embodiments, where the processor maintains a mapping relation between color adjustment and duty ration adjustment in a PWM control design.

Figure 11:
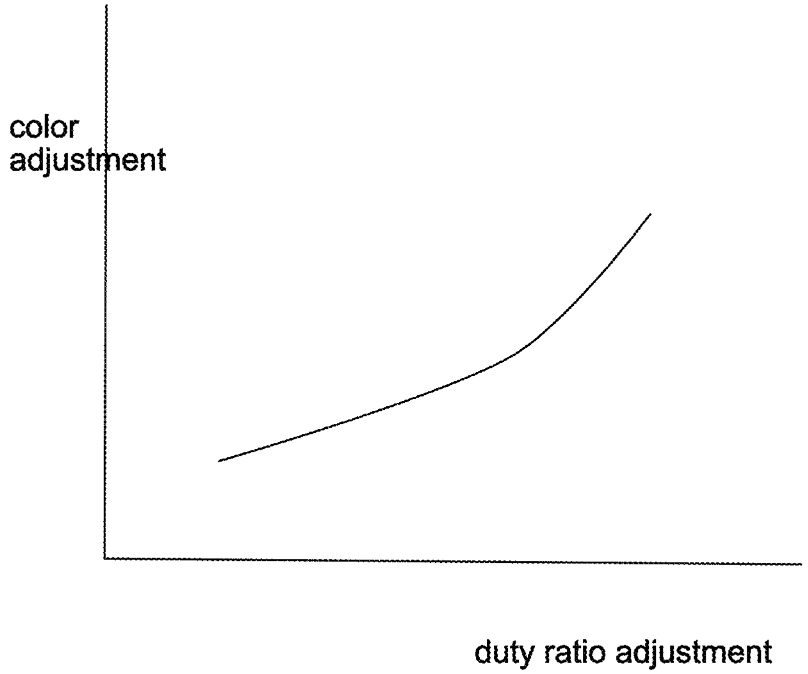
FIG. 11 illustrates relation between duty ratio and color adjustment.

FIG. 11 shows a relation between the color adjustment and the duty ratio adjustment. Although FIG. 11 is demonstrated as a two dimension diagram, persons or ordinary skilled in the art should know that the duty ratio may be a vector containing multiple values corresponding to different light zones and LED modules. Similarly, the color adjustment may be different under different color space coordinates, and some may have three or more dimensions.

FIG. 11 shows that the variation of the color adjustment, e.g. between two color coordinates, the distance of color may be non-linear to duty ratio adjustment.

In some embodiments, the control command indicates target colors of the multiple light zones.

The processor translates the control command to corresponding control signals.

In some embodiments, the processor provides a first mode that all light zones emit lights of same color.

The processor provides a second mode that different light zones emit lights of different colors.

In some embodiments, the processor provides a third mode that indicates an object type and the processor translates the object type to corresponding driving signals that generate colors to enhance camera image capturing of the object type.

The processor in an LED lighting system acts as a crucial intermediary, converting user or system-generated control commands into precise control signals that dictate the operation of the light fixtures. This conversion process is essential for achieving the desired lighting effects and functionalities. For example, in a basic scenario, the processor might receive a simple command to activate the lights and then generate the necessary signals to power the LEDs, adjusting parameters such as brightness and color based on the input command.

In more advanced embodiments, the processor can facilitate a variety of operational modes to accommodate different lighting needs. For instance, in a first mode, the processor ensures uniformity in lighting by making all light zones emit lights of the same color. This mode is particularly useful in environments where consistent lighting is crucial, such as in retail spaces or galleries, where it's important to have a coherent visual experience throughout the area.

Expanding on this, the processor can also offer a second mode that allows different light zones to emit lights of various colors. This capability is advantageous in settings like entertainment venues or multi-functional spaces where the lighting needs to adapt to different themes or activities. For example, in a concert hall, the processor might control different zones to emit colors that match the mood of each musical piece, enhancing the overall experience for the audience.

Further extending the processor's functionality, a third mode can be provided where the processor interprets the type of object being illuminated and adjusts the lighting to enhance camera image capturing of that object. In this mode, the processor might utilize sensors or input data to identify the object type—such as a barcode, a piece of artwork, or a person—and then generate driving signals that optimize the color and intensity of the lights to improve the object's visibility or highlight specific features for cameras. This mode is particularly beneficial in scenarios like security systems, where enhancing the visibility of individuals or objects can improve identification and surveillance accuracy, or in photography studios, where lighting conditions are adjusted to complement the subject matter.

These examples illustrate the processor's role as a dynamic and adaptable component within LED lighting systems, capable of translating a wide range of control commands into specific lighting actions. Through these varied operational modes, the processor enables the lighting system to meet diverse requirements, from creating ambient atmospheres to enhancing the functionality and effectiveness of lighting in specialized applications.

In some embodiments, where the processor maintains multiple reference color coordinates and corresponding duty ratio parameters.

The processor determines a target duty ratio parameter of a target color of the light zone by reference to adjacent reference color coordinates.

Figure 12:
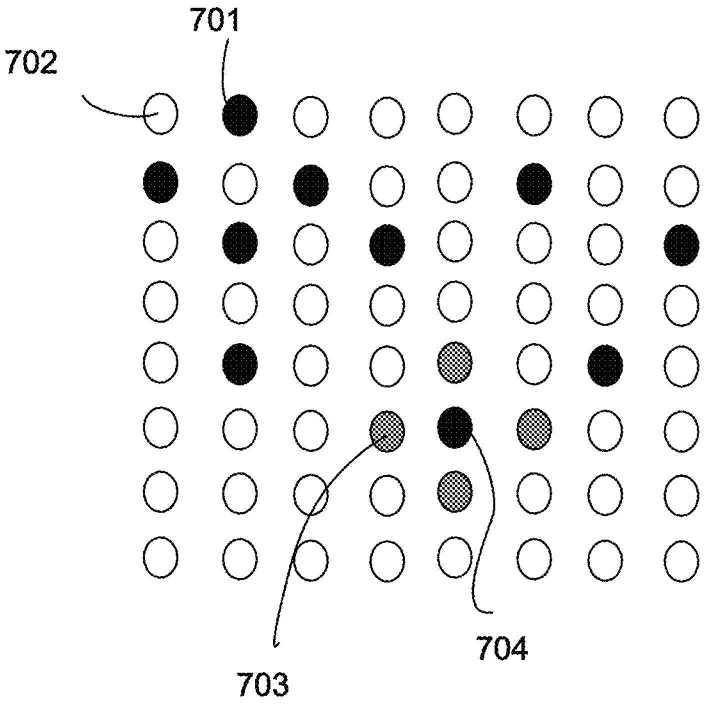
FIG. 12 illustrates reference color coordinates.

In FIG. 12, the circles refer to multiple color coordinates in a color space like CIE1931. Some coordinates may be selected as reference color coordinates 701 and their corresponding PWM duty ratio parameters are obtained in laboratory to optimize the result. For example, using an optical light analyzer and adjust different driving currents to different LED modules to mix a desired light. After repeated operation, persons of ordinary skilled in the art can record PWM duty ratio parameters supplied to a set of LED modules to mix a desired color.

When a target color 702 in real control is assigned, the processor finds one or multiple reference color coordinates and calculates an approximate PWM duty ratio parameters according to PWM duty ratios of these reference color coordinates in view of a given set of LED modules.

When there are sufficient reference color coordinates recorded in the processor, e.g. storing parameters in a memory device accessible by the processor, even target color is not known how to set its corresponding PWM duty ratio values at beginning, these parameters may be approximated based on above method.

In some embodiments, the processor calculates the target duty ratio parameter according to stored duty ration parameters of the reference color coordinates.

In some embodiments, the processor maintains a group range of target colors for each reference color coordinate.

In FIG. 12, the reference color coordinate 704 has four color coordinates adjacent to the reference color coordinate 704. They may be set according to the reference color coordinate 704.

The processor identifies the reference color coordinate by checking group ranges of the reference color coordinates.

In some embodiments, the control command indicates an adjustment path involves a color variation.

The processor uses a non-linear variation on duty ratio adjustment of the control signals. In color spaces like CIE 1931, distances between two coordinates are used to represent the difference in perceived color. However, the Euclidean distance in this color space may not always accurately reflect the perceived difference between colors due to the non-uniformity of human color perception. That is, equal distances in the color space do not necessarily correspond to equal perceptual differences in color.

This discrepancy arises because the CIE 1931 color space is based on direct measurements of human color perception, which are inherently non-linear. Human eyes are more sensitive to certain colors and less to others, meaning that a small change in a color coordinate in one part of the color space can be perceived as a more significant change than the same numerical change in another part of the space.

Therefore, non-linear transformations in color processing are crucial to more accurately reflect the non-uniform nature of human color perception. For example, in the CIE 1931 color space, the area representing green hues is much larger than the area for reds or blues, indicating that humans can perceive more shades of green. Therefore, a linear change in coordinates within the green area might result in a perceptual change that is either too subtle or too exaggerated when compared to the same change in the blue area of the space.

To address this, color models like CIELAB and CIECAM02 have been developed. These models apply non-linear adjustments to the raw CIE 1931 data to produce a color space where the same distance between any two points more closely corresponds to similar levels of perceived color difference. This non-linearity ensures that color manipulations, like gradients or transitions, appear smooth and consistent to the human eye.

For instance, in applications like digital imaging, graphic design, and display technology, employing non-linear color space transformations ensures that color grading, blending, and other manipulations result in natural and perceptually uniform changes. In LED lighting, non-linear control of color mixing can simulate natural lighting conditions more realistically, enhancing the ambiance and mood of a space. For example, mimicking the color and intensity of a sunset requires a non-linear transition in both color and luminance to replicate the natural progression from daylight to dusk accurately.

In summary, the non-linear nature of human color perception makes non-linear transformations essential in color space operations. These transformations ensure that color changes and manipulations are consistent with human visual experience, leading to more accurate and aesthetically pleasing results in various applications.

In some embodiments, control of the light zones are separately added to the processor.

In some embodiments, the control command includes multiple sub-commands respectively for controlling different light zones.

FIG. 10 show sub-commands 613 are mapping to specific light zone 608.

In some embodiments, the processor receives the sub-commands from a remote control 612 and generates the control signals according to received sub-commands of the remote control.

In some embodiments, the light zones are mounted on different brackets for directing lights to different directions.

Figure 4:
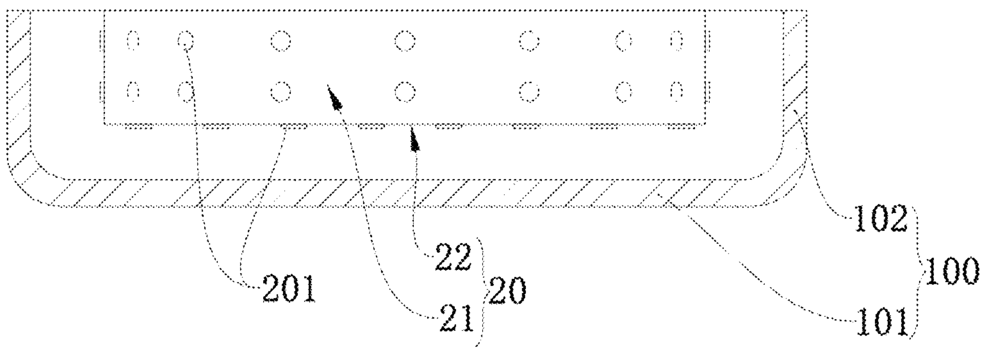
FIG. 4 illustrates another view of LED arrangement pattern.

FIG. 4 shows that LED modules 201 are mounted on different brackets facing to different directions.

In some embodiments, the light zones comprise optical components 801 to change light directions of the light zones. The optical component 801 may include multiple lenses corresponding to LED modules below the lenses to change light paths for diffusion or condesing lights depending on different requirements.

In the design of LED lighting systems, the inclusion of lenses as light covers plays a pivotal role in directing and shaping the emitted light. These optical components are strategically positioned to interact with the light zones, effectively altering the trajectory and distribution of the light beams. In certain embodiments, these optical components, designated as element 801 in the schematic, are employed to modify the light directions emanating from the light zones. This manipulation is crucial for tailoring the lighting output to specific application needs or desired effects.

The optical component 801 may comprise an array of lenses, each aligned with corresponding LED modules situated beneath them. These lenses serve as the medium through which the light paths are altered, either by diffusion or condensing. Diffusion lenses scatter the light, reducing glare and creating a more uniform illumination over a wider area. This diffusion is particularly beneficial in environments where soft, evenly distributed light is needed, such as in residential or office spaces, where direct lighting can cause discomfort or eye strain.

Conversely, condensing lenses focus the light, narrowing the beam to create more intense and directed illumination. This condensing effect is advantageous in situations where targeted lighting is required, such as in spotlighting or task lighting, where the light needs to be concentrated on specific areas or objects to enhance visibility and detail.

The design and material of these lenses play a significant role in determining the extent of light manipulation. Factors like the curvature, thickness, and refractive index of the lens material influence how the light is bent and focused. By selecting appropriate lenses, designers can control the spread and intensity of the light, ensuring that it meets the specific requirements of the lighting application.

Moreover, in advanced LED lighting systems, these lenses can be designed to work in tandem with the adjustable output of the LED modules, allowing for dynamic control over the lighting conditions. For instance, by varying the intensity of the LEDs in conjunction with the optical properties of the lenses, one can achieve a range of lighting effects, from soft, ambient lighting to focused, high-intensity beams.

In conclusion, the use of lenses as light covers in LED lighting systems provides a versatile and effective means of directing and shaping light. By carefully selecting and integrating these optical components into the lighting design, it is possible to achieve a wide range of lighting distributions and effects, catering to diverse lighting needs and enhancing the overall functionality of the lighting system.

In some embodiments, filters are added to the light zones to change spectral distributions of the light zones.

In certain embodiments within LED lighting systems, filters are strategically incorporated into the light zones to modify the spectral distributions of these areas. This alteration is fundamental to achieving specific lighting characteristics or functionalities tailored to the needs of the environment or application in question. When filters are applied to the light zones, they act as selective barriers that can either absorb or transmit light at different wavelengths, thereby reshaping the spectrum of the emitted light.

The incorporation of filters into the light zones enables a versatile adaptation of the lighting output. For instance, in a setting where the natural appearance of colors is crucial, such as in a gallery or retail space, filters can be used to adjust the spectral output of the LEDs to enhance color rendering, making the colors of objects appear more vibrant and true to life. This adjustment is achieved by modifying the balance of different wavelengths in the light, ensuring that the illumination closely mimics the spectrum of natural daylight or enhances specific colors in the visible spectrum.

Moreover, the use of filters in light zones allows for dynamic control of the lighting atmosphere. In a multipurpose venue, for example, filters can change the spectral distribution to create different ambiances for various events. A filter that emphasizes warm colors can create a cozy and inviting atmosphere for a social gathering, while a filter that enhances cool colors might be employed to create a more focused and alert environment for a conference or meeting.

The integration of filters with LED lighting also extends to functional applications, such as in agricultural or medical fields, where specific light spectra are necessary to promote plant growth or to conduct medical examinations and procedures. In these cases, filters can fine-tune the LED light to emit specific spectral bands that are optimal for plant photosynthesis or that provide the clarity and contrast needed for medical imaging.

In summary, the addition of filters to the light zones in LED lighting systems is a testament to the flexibility and adaptability of LED technology. By changing the spectral distributions through filters, the lighting can be customized to meet a wide range of aesthetic, functional, and biological requirements, enhancing the utility and versatility of LED lighting solutions in diverse applications.

Filters are integral components in modifying the spectral distribution of light, with their functionality deeply rooted in their chemical composition. Colored glass filters, for instance, leverage the light-absorbing properties of metal ions such as cobalt or selenium. Cobalt imparts a distinct blue coloration to the glass, effectively filtering out red and green light to allow only blue light to pass. Conversely, selenium gives glass a ruby red hue, selectively transmitting red light while blocking other wavelengths.

Gelatin filters, commonly utilized in photography and theatrical lighting, comprise transparent gelatin infused with various dyes. These dyes, which can range from simple organic compounds to complex molecular structures, are chosen for their ability to absorb specific wavelengths of light. For example, yellow filters might incorporate azo dyes to absorb blue light, thereby permitting yellow and red light to be more prominent.

In the realm of high precision and specificity, interference filters stand out. They consist of multiple layers of materials like titanium dioxide and silicon dioxide, each with distinct refractive indices. This layering creates patterns of interference, allowing such filters to reflect or transmit light in a highly controlled manner, thus enabling the precise selection of wavelengths that can pass through the filter.

Polymer filters represent another category, where plastics are embedded with dyes or pigments to achieve the desired spectral filtering. These filters are versatile, with the embedded substances varying widely to absorb different parts of the spectrum. For example, filters designed to block infrared light might include compounds like phthalocyanines, which are effective in absorbing light in the infrared region while allowing visible light to pass through.

Lastly, specialized filters like UV and IR filters are designed to block ultraviolet and infrared light, respectively. They are made from materials that have strong absorption in these regions. For instance, UV filters might use cerium oxide, known for its ability to absorb UV radiation, whereas IR filters could incorporate materials like indium tin oxide, effective in blocking infrared wavelengths.

Through the strategic selection and combination of these various chemicals and compounds, filters can be engineered to exhibit specific light-absorbing and transmitting properties. This adaptability makes them invaluable tools in the manipulation of light, whether for enhancing the performance of LED lighting systems, protecting against harmful radiation, or achieving the desired visual effects in photography and cinematography.

In some embodiments, the processor records filter parameters of the filters to calculate the control signals.

For example, the filters are analyzed and their paragraphs are collected in the laboratory. These filters are categorized and given identifiers. When designing the lighting apparatus, the filters parameters are assigned to the processor so that the processor knows how to control accordingly to mix desired colors.

In some embodiments, a light cover is disposed above the LED modules, and distance between two adjacent LED modules is less than ⅓ of height between the LED modules and the light cover.

Figure 13:
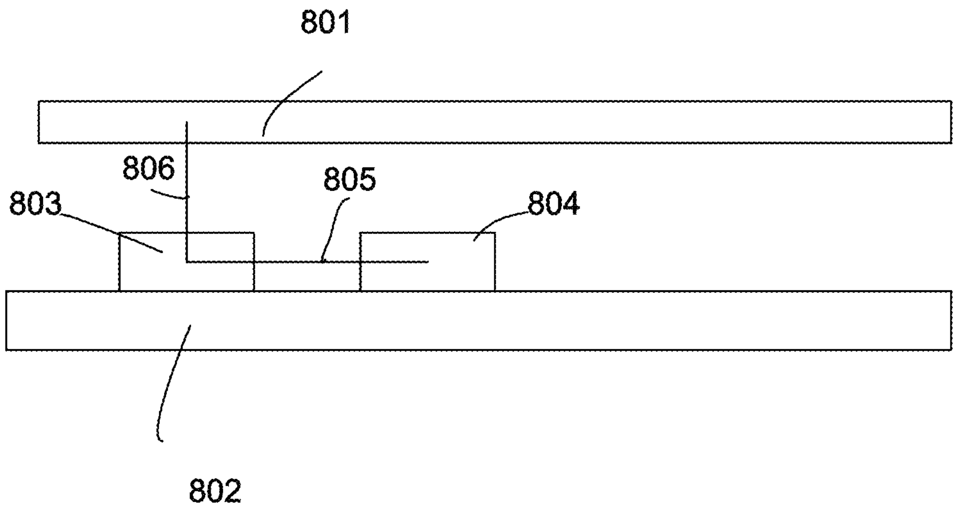
FIG. 13 shows relation among components.

In FIG. 13, there is a distance 806 as a height between the LED module 806 and the light passing cover 801. On the light source plate 802, there is another LED module 804. There is a distance between the two LED modules 803, 804. It is found that the ratio of the distance 805 is better less than ⅓ of the height 806.

In some embodiments, when the processor handles a color adjustment from a starting color to a destination color, the processor calculates two boundary colors in a color space according to a line passing the starting color and the destination color.

Figure 9:
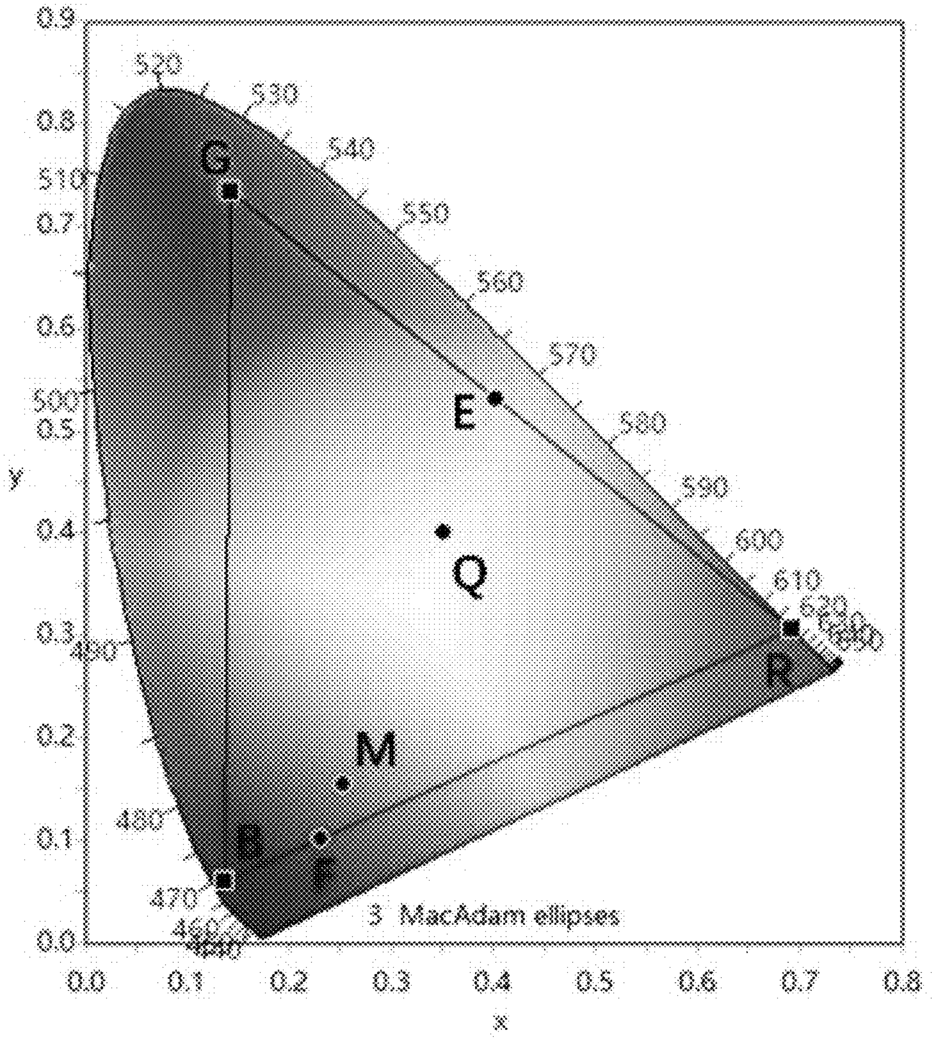
FIG. 9 illustrates color coordinates in a color space.

In FIG. 9, the M coordinate is the starting color, and Q is the destination color to be found. By extending the line of M and Q, there are two colors, E and F as the boundary colors in the color space that enclosed by a triangle B, R, G.

The processor uses duty ratio parameters of the starting color and the two boundary colors.

In some embodiments, the processor transforms the color from a first color space to a second color space to find multiple intermediate colors in the second color space during color adjustment.

Figure 14:
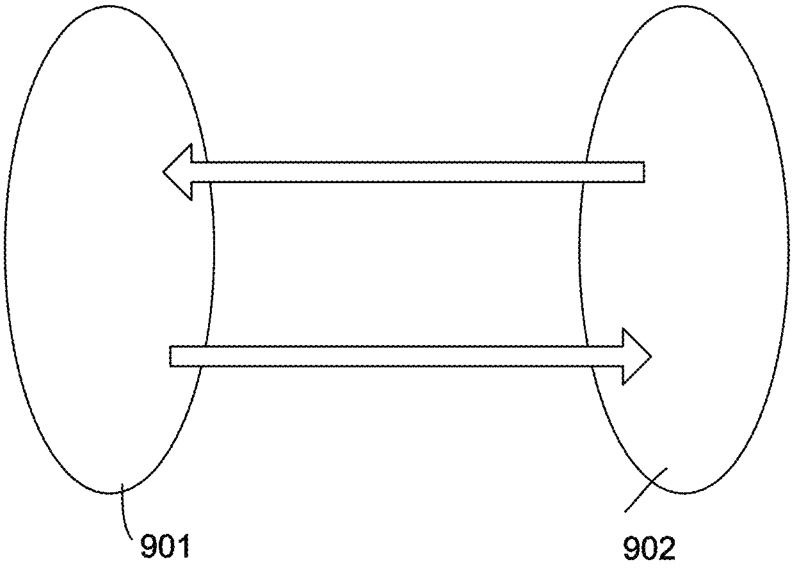
FIG. 14 shows transformation between color spaces.

FIG. 14 shows during calculation mentioned above, the color coordinates are transformed from one color space 901 to anther color space 902. After certain operations are expected, e.g. find better metrics or color difference, the result is transformed back to the original color space.

In some embodiments, the first color space is CIE1931.

Figure 1:
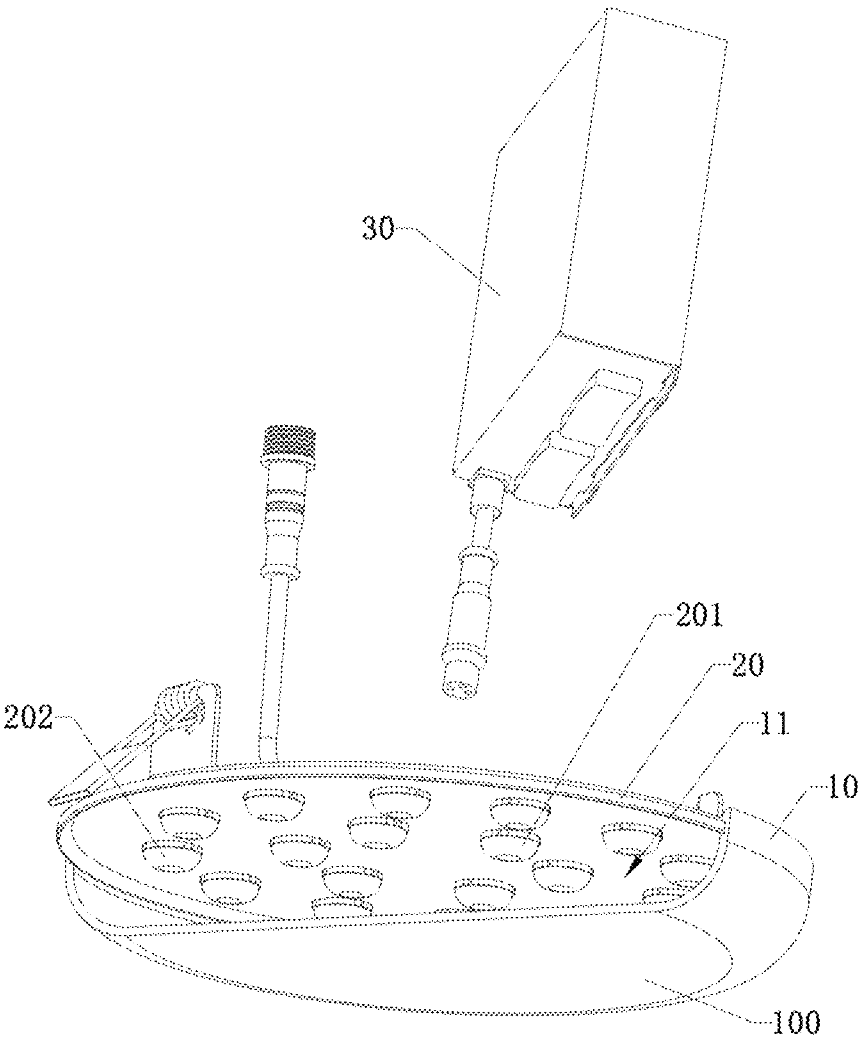
FIG. 1 illustrates a lighting apparatus embodiment.

Please refer to FIG. 1, which shows a lighting apparatus. In FIG. 1, the lighting apparatus includes LED modules 201, 202 mounted on a light source plate 11 as a light source. There is a housing 10 comprising a light passing cover 100. A driver 30 is used for providing driving currents and controls of the LED modules.

Figure 2:
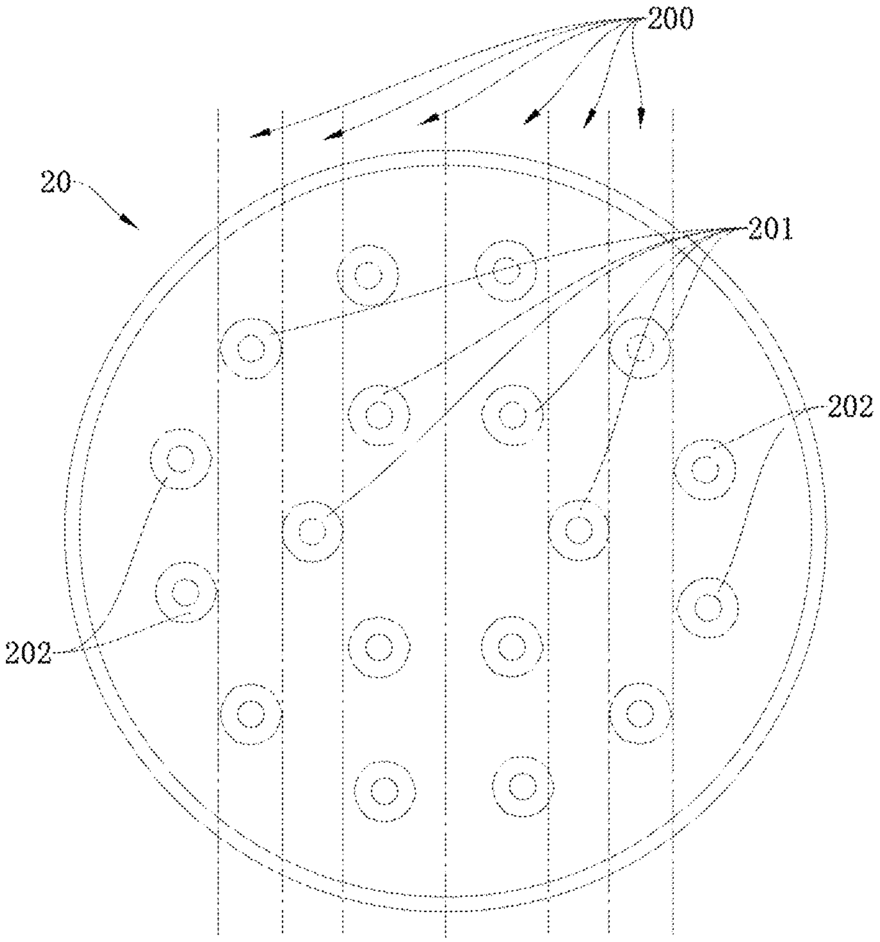
FIG. 2 illustrates LED modules arrangement.

FIG. 2 shows a top view of LED modules arrangement.

In FIG. 2, there are different types of LED modules 201, 202 forming a light source 20. Some of the LED modules 200 emit white light while some emit red, blue, green or other colors.

Figure 3:
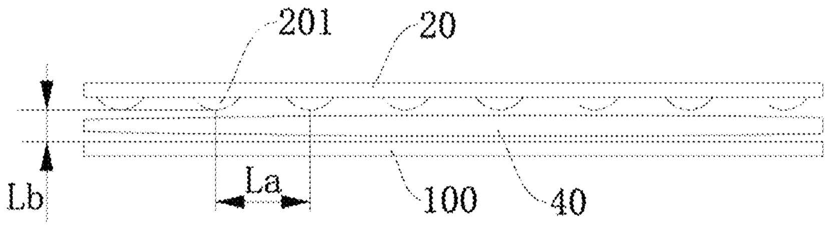
FIG. 3 illustrates LED arrangement pattern.

FIG. 3 shows a side view of the example. La and Lb refers to the distance between LED modules 201 of the light source 20. Lb refers to the height between the LED module 201 to the light passing cover 100. There may be lenses 40 or filters to change light parameters.

FIG. 4 shows an example that the light source may include LED modules 201 mounted on different planes 21, 22 for emitting lights in more different directions.

The light passing cover 100 may have a first light output surface 101 and a second light output surface 102.

Figure 5:
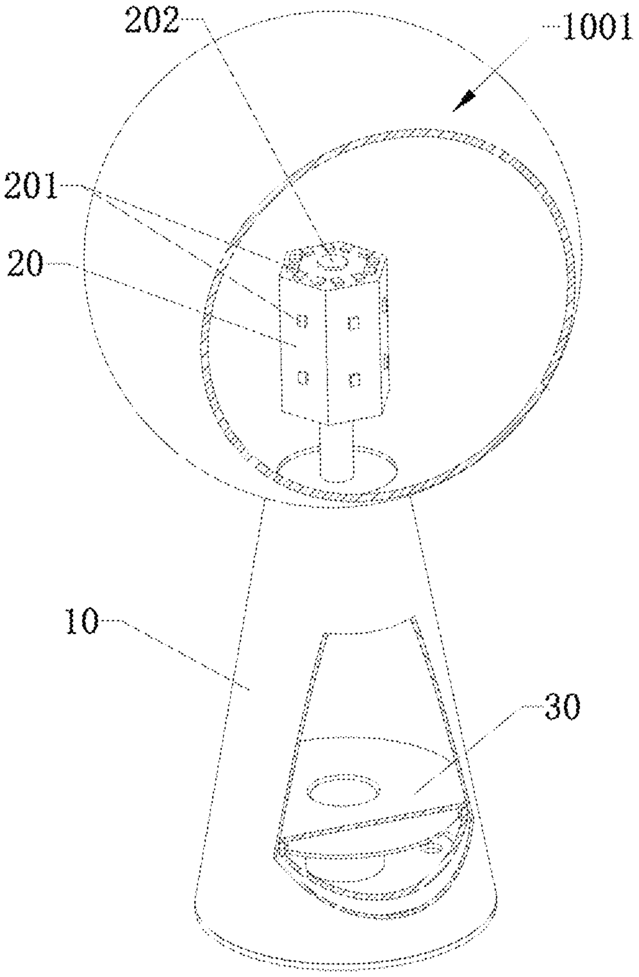
FIG. 5 illustrates another lighting apparatus embodiment.
Figure 6:
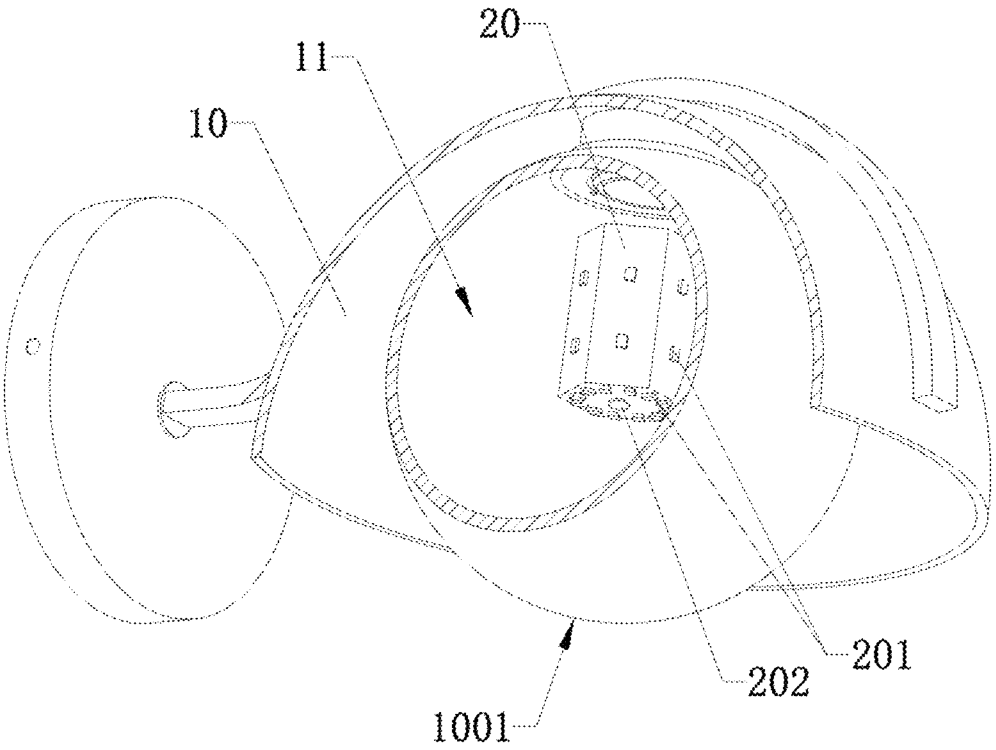
FIG. 6 illustrates another view of the lighting apparatus.
Figure 7:
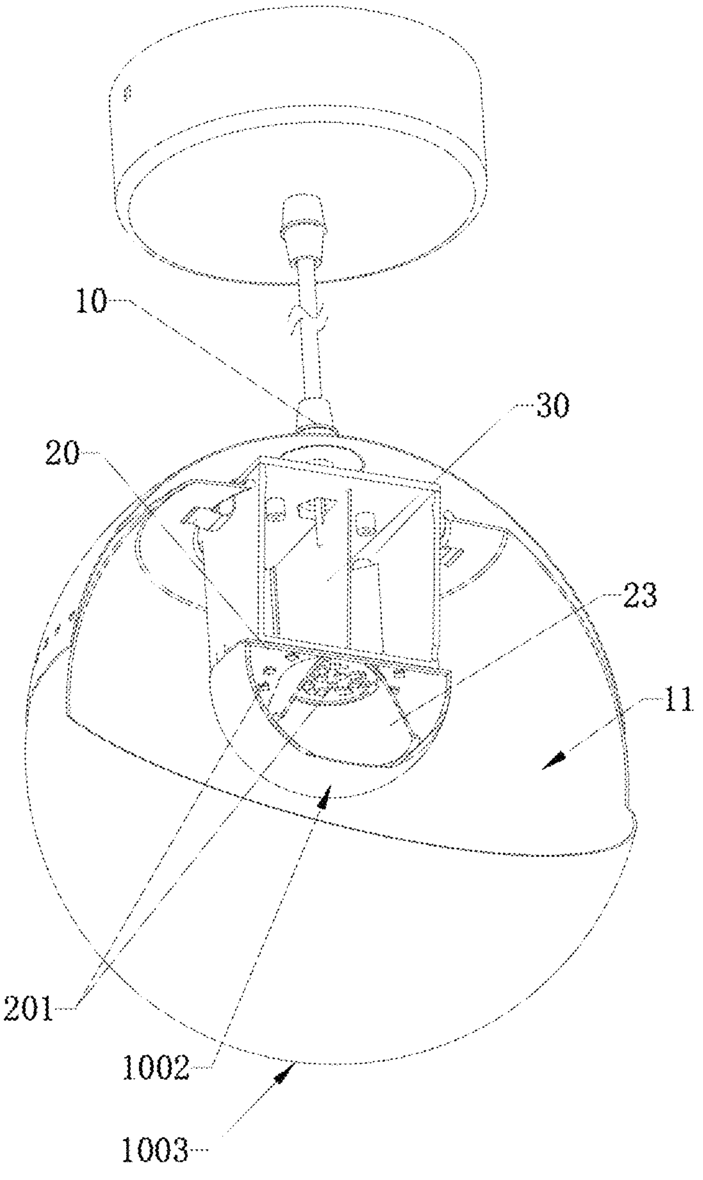
FIG. 7 illustrates another view of the lighting apparatus.

FIG. 5, FIG. 6 and FIG. 7 show another example. In this example, LED modules 201, 202 of a light source 20 are mounted on a multi-surface structure. A driver 30 is disposed in the housing 10.

The lighting apparatus 11 may dispose its driver 30 at different locations.

Figure 8:
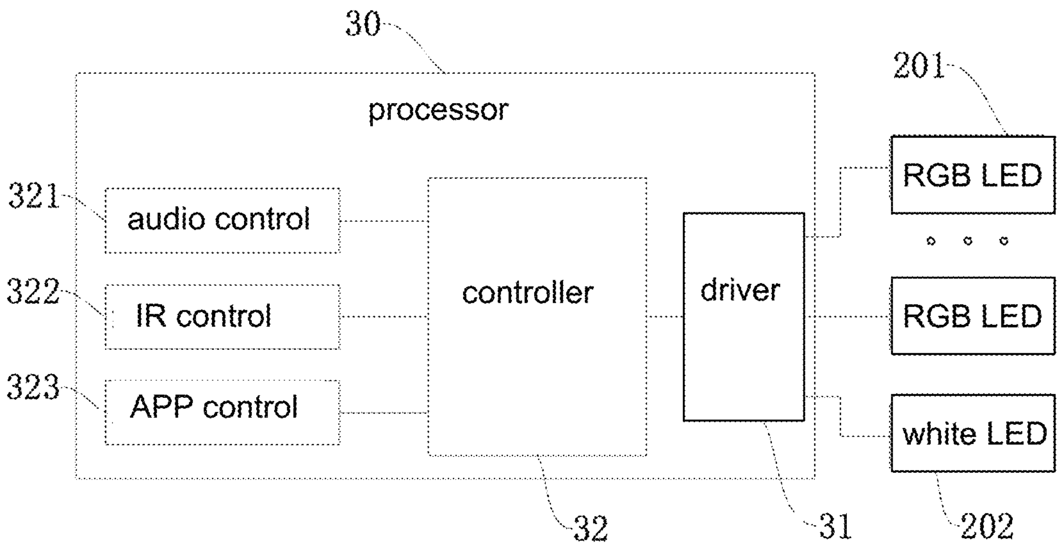
FIG. 8 illustrates a system architecture of the lighting apparatus embodiment.

FIG. 8 shows a structure diagram.

In FIG. 8, a lighting system may include a processor 30 that has audio control 21, IR control 22 and APP control 23. These controllers translate commands and transmit them to the controller 32. The controller 32 generates control signals to the driver 31 that generates driving currents to the LED modules 201, 202.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source module comprising multiple light zones, wherein different light zones have different LED module combinations;

a driver coupled to an external power source to generating driving currents to the light source module; and a processor for receiving a control command for adjusting colors of the multiple light zones separately by sending control signals to the driver, wherein the control signals indicate duty ratios of the multiple LED modules of the multiple light zones to adjust the colors of the multiple light zones, wherein when the processor handles a color adjustment from a starting color to a destination color, the processor calculates two boundary colors in a color space according to a line passing the starting color and the destination color, wherein the processor uses duty ratio parameters of the starting color and the two boundary colors.

2. The lighting apparatus of claim 1, where the processor maintains a mapping relation between color adjustment and duty ration adjustment in a PWM control design.

3. The lighting apparatus of claim 1, wherein the control command indicates target colors of the multiple light zones, wherein the processor translates the control command to corresponding control signals.

4. The lighting apparatus of claim 1, wherein the processor provides a first mode that all light zones emit lights of same color, wherein the processor provides a second mode that different light zones emit lights of different colors.

5. The lighting apparatus of claim 4, wherein the processor provides a third mode that indicates an object type and the processor translates the object type to corresponding driving signals that generate colors to enhance camera image capturing of the object type.

6. The lighting apparatus of claim 1, where the processor maintains multiple reference color coordinates and corresponding duty ratio parameters, wherein the processor determines a target duty ratio parameter of a target color of the light zone by reference to adjacent reference color coordinates.

7. The lighting apparatus of claim 6, wherein the processor calculates the target duty ratio parameter according to stored duty ration parameters of the reference color coordinates.

8. The lighting apparatus of claim 6, wherein the processor maintains a group range of target colors for each reference color coordinate, wherein the processor identifies the reference color coordinate by checking group ranges of the reference color coordinates.

9. The lighting apparatus of claim 1, wherein the control command indicates an adjustment path involves a color variation, wherein the processor uses a non-linear variation on duty ratio adjustment of the control signals.

10. The lighting apparatus of claim 1, wherein control of the light zones are separately added to the processor.

11. The lighting apparatus of claim 10, wherein the control command includes multiple sub-commands respectively for controlling different light zones.

12. The lighting apparatus of claim 11, wherein the processor receives the sub-commands from a remote control and generates the control signals according to received sub-commands of the remote control.

13. The lighting apparatus of claim 1, wherein the light zones are mounted on different brackets for directing lights to different directions.

14. The lighting apparatus of claim 13, wherein the light zones comprise optical components to change light directions of the light zones.

15. The lighting apparatus of claim 13, wherein filters are added to the light zones to change spectral distributions of the light zones.

16. The lighting apparatus of claim 15, wherein the processor records filter parameters of the filters to calculate the control signals.

17. The lighting apparatus of claim 1, wherein a light cover is disposed above the LED modules, and distance between two adjacent LED modules is less than ⅓ of height between the LED modules and the light cover.

18. The lighting apparatus of claim 1, wherein the processor transforms the color from a first color space to a second color space to find multiple intermediate colors in the second color space during color adjustment.

19. The lighting apparatus of claim 18, wherein the first color space is CIE1931.

* * * * *